United States Patent Office 2,832,703
Patented Apr. 29, 1958

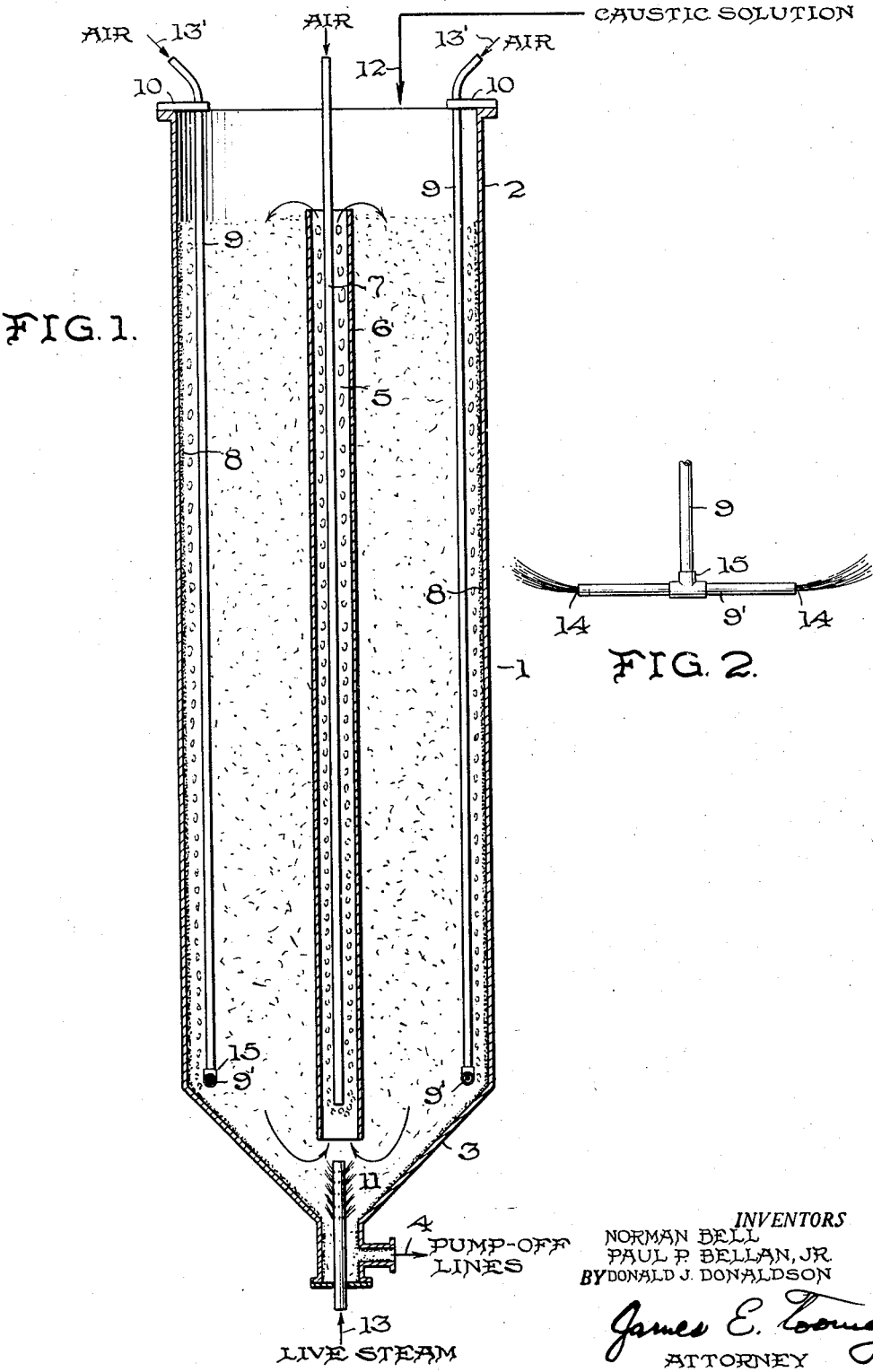

2,832,703

CHEMICAL PROCESS

Norman Bell and Paul P. Bellan, Jr., Baton Rouge, La., and Donald J. Donaldson, Oakland, Calif., assignors to Kaiser Aluminum & Chemical Corp., Oakland, Calif., a corporation of Delaware Application May 13, 1955, Serial No. 508,172

6 Claims. (Cl. 134—22)

This invention relates to a method for removing adherent scale formations from apparatus employed for precipitating alumina hydrate from alkaline aluminate solutions. More particularly, the invention relates to a method for removing alumina trihydrate scale formations from precipitation apparatus employed in the Bayer type processes for recovering alumina from aluminous ores. Specifically, the herein described invention relates to a wet method for removing adherent alumina trihydrate scale formations from apparatus employed in Bayer type operations for precipitation purposes wherein the precipitation is carried out by the hydrolysis of the alumina trihydrate from the green caustic aluminate liquors by cooling and seeding the liquors with previously precipitated alumina trihydrate.

It is an object of the herein described invention to provide a wet method for removing hydrate scale formations from precipitation apparatus employed in alkaline alumina recovery processes.

It is a further object to provide a wet process for removing scale formations from precipitation apparatus employed in Bayer type processes which is simple and effective for practical descaling purposes.

Other and further objects will be apparent from the following description and disclosure set forth herein.

The Bayer process involves the dissolution of alumina from aluminous ores such as bauxites in alkaline liquors followed by the separation of the insoluble residues from the green liquors produced thereby. The green or pregnant caustic aluminate liquors are then cooled and subjected to precipitation conditions to promote deposition of alumina trihydrate crystals therefrom. Thereafter, the deposited hydrate is separated from the liquor, calcined and the spent liquors recycled for further extraction purposes.

As is well known to those skilled in the art, the alumina trihydrate deposits from the pregnant caustic aluminate liquors not only as minute crystalline particles but also as scale formations on the walls of the apparatus employed for the hydrolysis and precipitation step. These scale deposits are permitted to build up to a predetermined level during actual operations whereafter the apparatus is removed from operation and the scale is removed from the apparatus, for example, by means of air hammers. It is apparent that these scale removal methods are expensive and that other methods are highly desirable to increase the overall efficiency of operation of an alumina refining plant.

According to the invention herein described, it has been discovered that a caustic soda solution may be employed most effectively and economically for removing or dissolving these adherent scale formations providing surface agitation is employed adjacent the scale deposit areas during the dissolution step. The surface agitation referred to may be developed by mechanical or other suitable means. However, it has been found that the desired agitation is most readily and effectively accomplished by permitting a sheet of gas, such as air, to pass along the surface of the scale deposits. In actual Bayer plant precipitation practice, the vessels employed are open vessels having vertical walls to which the scales rigidly adhere. By inserting air at a plurality of points adjacent the lower scale deposits in the caustic solvent containing tanks, the air in its journey to the surface of the liquor along the sides of the apparatus promotes good agitation which greatly facilitates the rapid dissolution of the scale deposits from the tank surfaces.

Although the surface agitation is deemed critical to the realization of the objects of the invention, it is apparent that the caustic solution employed as a solvent should maintain its solvent characteristics throughout the descaling operation. In this regard, it has generally been ascertained that a $\Delta A/C$ ratio of greater than .125 should be maintained during the dissolution reaction from a practical point of view to accomplish efficient solvent action in an economical manner. Still further, it has generally been ascertained that temperature conditions throughout the dissolution step should be maintained in excess of about 160° F. and that the caustic soda concentration of the liquor should be maintained in excess of about 100 grams per liter in combination with the minimum $\Delta A/C$ ratio of .125 and the surface agitation.

Alumina (A) as herein used with reference to concentrations thereof in caustic soda solutions is reported as $Al_2O_3$ on a weight basis. Caustic soda (C) represents free sodium hydroxide in solution plus the soda content in combination with dissolved alumina and is reported as the equivalent weight of $Na_2CO_3$. $\Delta A/C$ ratio refers to the A/C ratio representing equilibrium conditions of alumina concentration with respect to the caustic soda concentration at the particular temperature conditions of the liquor minus the A/C ratio representing the actual alumina concentration with respect to the caustic soda concentration of the liquor. It is apparent to those skilled in the art that for any caustic soda concentrations and temperature of the solution there is a given alumina concentration representing equilibrium solubility which can be expressed as a weight ratio of the alumina to the caustic soda.

The $\Delta A/C$ ratio as expressed above can be thought of as the potential solvent capacity of the caustic solution for alumina hydrate scale. Thus, a solvent caustic solution which has a $\Delta A/C$ of .125 would be one that is not at equilibrium with respect to the total possible solubility of alumina hydrate therein.

When the solution is at equilibrium conditions, the $\Delta A/C$ would be 0. Thus, the greater the $\Delta A/C$ ratio of the solvent, the greater is the potential solvent capacity for dissolving the alumina hydrate scale. As stated above, the $\Delta A/C$ ratio of the solvent must be greater than .125 for efficient solvent action in an economical manner.

In the preferred embodiment of the invention the temperature conditions of the solvent liquor are maintained between about 180° F. and the boiling point of the caustic solution. Although the temperature of the solvent liquor may vary during the scale dissolution step, it is preferable to maintain these higher temperature conditions in order to obtain the greatest effectiveness from the agitation at the surface of the scale, lower temperatures can be tolerated although the period required for complete dissolution of the scale increases as lower temperatures are employed with the same amount of surface agitation.

Similarly, although the caustic soda concentration should be in excess of 100 grams per liter under the minimum $\Delta A/C$ ratio conditions of .125, in the preferred embodiment caustic soda concentrations in excess of about 125 grams per liter under ΔA/C ratio conditions of not less than about .180 should be employed in combination with the preferred temperature conditions and surface agitation.

As a specific example of the method of descaling according to the invention the following is given:

*Example*

The scale coated tank subjected to the wet descaling process was a conventional precipitation tank employed in Bayer type alumina refining operations such as found in the United States. The tank was 24 feet in diameter, had a 60 feet high cylindrical portion with a 45° cone attached to the bottom thereof. The tank had been employed for 80 batch charges of pregnant liquor for recovering the alumina content thereof by seeding with previously precipitated hydrate and cooling, and had an estimate weight of adherent scale on the walls amounting to 97,500 pounds. This is equivalent to 62,500 pounds of alumina as $Al_2O_3$. The scale was adhering rigidly to the walls of the tank from about 6 feet below the top of the cylindrical portion and occurred in a comparatively thin layer for the first 8 to 10 feet down from the uppermost scale formations. Thereafter, the scale was practically of a uniform thickness throughout the remaining lower portions of the tank.

Agitation during the process was accomplished by the operation of an airlift such as is customarily employed in American practice during precipitation operations. For the purpose of providing a sheet of gas along the surface of the scale, four 1″ pipes, 3′ long were installed equidistant around the circumference of the tank just above the top of the cone. The pipes were placed horizontally into the tank 30° away from a tangent to the tank and connected to a 100 p. s. i. compressed air supply during operation.

196,500 gals. of a caustic solution having an average alumina content of 16.6 grams per liter was then pumped into the tank so that the scale portions were below the surface thereof. This filling period required 16 hours during which the temperature was maintained from about 170 to 185° F. by operation of a live steam injector located in the bottom of the tank cone. At the end of the filling period the solution was analyzed. The concentration of caustic soda was about 234 grams per liter and the alumina content was about 28.7 grams per liter. This would indicate that the average rate of scale removal during the filling period was 1,250 pounds per hour.

Thereafter the airlift was placed in operation and a sheet of gas provided along the surface of the scale to promote agitation of the liquor in the immediate proximity thereof. The latter was accomplished by means of the four air pipes placed just above the top of the cone.

This agitation period was continued for 55 additional hours until the scale was substantially all dissolved. The temperature of the solvent varied during this period from between 168° F. to 195° F., the estimated average temperature being 180° F. At the end of the run the caustic soda concentration was about 217 grams per liter and the alumina concentration was about 46.3 grams per liter, dilution from condensed steam having caused the decrease in caustic soda concentration. The average ΔA/C was .225 and the overall average rate of alumina removal was 790 pounds per hour.

After the tank was drained, it was found that scale was undissolved on the side walls of the cylindrical portion where the air had not passed over the surface thereof. This amounted to about 3,000 pounds of scale at the bottom of the tank where the air insertion method failed to provide a sheet of air adjacent the scale. It is apparent therefore that the agitation provided at the surface of the scale deposits is critical to the obtainment of the resulting objects of the invention.

The invention will be more fully understood and appreciated by referring to the accompanying diagrams wherein there is depicted schematically in Figure I a tank of the general shape and configuration employed for autoprecipitating alumina from green caustic aluminate liquor produced according to Bayer type operations and which contains apparatus for carrying out the wet descaling method according to the process of the herein described invention. Figure II schematically represents apparatus for distributing air at the base of the apparatus shown in Figure I.

1 represents generally a precipitation tank employed for Bayer type autoprecipitation operations and includes an elongated cylindrical shell portion 2 attached to an inverted cone portion 3 having suitable pump off lines 4 attached to the apex thereof. An airlift 5, including an outer pipe 6 and an inner air pipe 7 such, as usually employed in American plants for seed suspension and mixing purposes, is shown. Alumina hydrate scale formations 8 are shown adhering to the walls of the precipitation tank 1.

Apparatus for carrying out the method of the invention is shown in operating relationship. Flexible rubber air hoses 9, suspended by suitable brackets 10 from the top of the tank, are shown as extending to the bottom of the cylindrical portion 2 whereat they connect with and pass air to air distribution pipes 9′ through a suitable connection T 15. Live steam heater 11 is suitably placed, as for example, near the apex of cone portion 3 of tank 1.

According to the method for scale removal, the precipitation tank 1 may be filled with caustic solution as by means of pipe 12 to cover all scale deposits 3 intended for removal. The proper temperature of the caustic solution may be obtained by direct live steam addition such as by feeding live steam 13 to heater 11 from whence it is injected directly into the solution, for example, through a plurality of holes or orifices in heater 11. General agitation of the caustic may be accomplished in the same manner as agitation is accomplished in actual precipitation operations, that is by means of the operation of airlift 5. Thus, air is inserted into air pipe 7 under pressure from where it enters the confines of outer pipe 6 at a point near the bottom of the tank and proceeds upward within the pipe carrying along caustic solution. In general, the circulation caused by the airlift is such as depicted by the arrows at the bottom and top of pipe 6. The agitation near the cone 3 accomplished by regular operation of the airlift is usually adequate for removing the scale therefrom.

To accomplish the desired agitation along the surface of the vertical side walls air may be inserted in a plurality of air hoses 9 as at 13′ and discharged therefrom near the bottom of the cylindrical portion 2 through air distribution elements 9′. This surface agitation caused by the air inserted through air distribution elements 9′ greatly facilitates and accelerates the dissolution of the scale on the side walls. The number of points at which the air is inserted along the side walls, of course, depends upon the diameter of the tanks. However, it is apparent that the agitating effect of the air inserted should be sufficient to maintain agitation between adjacently placed elements and to provide for a sheet of rising air bubbles immediately adjacent the scale surfaces. In general, this can be accomplished in a number of ways such as by directing the streams of air from the air hoses 9 parallel to the surface of the liquid as by means of air distribution elements 9′ so that the jet or jets of air initially sweep horizontally along the scale surfaces at the bottom of the tank. These elements will greatly facilitate distribution of the air throughout the lower portion of the tank along the scale surfaces thereat presented, and permit a distribution of the air all along the scale deposits on the walls as the air progresses toward the surface. In this manner a sheet of air will be presented along the surface of the scale.

The air distribution element shown is merely a pipe having the air hose 9 centrally attached thereto, as for example, through a suitable connecting T 15. The air emerges at the extremities 14 of the pipe.

It will be apparent that the invention is not limited to the specific means for accomplishing surface agitation such as herein described and that other methods for agitating the caustic adjacent the scale surfaces may also be employed such as by means of mechanically operated paddles.

Still further it will also be apparent that the invention is not limited to batch type scale removal methods, but rather contemplates continuous methods wherein fresh caustic solution is continually added to the tank with the continuous removal of like amounts therefrom.

What is claimed is:

1. The method of dissolving alumina hydrate scale deposits from precipitation apparatus employed in alkaline alumina refining operations comprising contacting said scale with a caustic soda solution having a potential solvent capacity for alumina hydrate, expressed as an alumina-to-caustic ratio, of greater than .125, while agitating the solvent solution at the surrounding surface area of the said scale deposits.

2. The method according to claim 1 wherein said agitation is accomplished by passing a stream of air bubbles along the surface of said scale deposits.

3. The method of dissolving alumina hydrate scale deposits from precipitation apparatus employed in alkaline alumina refining operations comprising contacting said scale with a caustic soda solution having in excess of 100 grams caustic soda per liter and having a potential solvent capacity for alumina hydrate, expressed as an alumina-to-caustic ratio, of greater than .125, and at temperatures between 165° F. and the boiling point of the solution while agitating the solvent solution at the surrounding surface area of the said scale deposits.

4. The method according to claim 3 wherein said agitation is accomplished by passing a stream of air bubbles along the surface of said scale deposits.

5. The method of dissolving alumina hydrate scale deposits from precipitation apparatus employed in Bayer alumina refining operations comprising contacting said scale with a caustic solution having in excess of 125 grams per liter and having a potential solvent capacity for alumina hydrate, expressed as an alumina-to-caustic ratio, of greater than .180 and at temperatures between 180° F. and the boiling point of the solution while agitating the solvent solution at the surrounding surface area of the said scale deposits.

6. The method according to claim 5 wherein said agitation is accomplished by passing a stream of air bubbles along the surface of said scale deposits.

References Cited in the file of this patent

UNITED STATES PATENTS

| | | |
|---|---|---|
| 2,345,134 | Lindsay | Mar. 28, 1944 |
| 2,662,041 | Dougherty | Dec. 8, 1953 |
| 2,662,042 | Dougherty | Dec. 8, 1953 |